July 31, 1923.  1,463,752

L. RASCH

SEPARATING DISKS IN CENTRIFUGAL SEPARATORS

Filed Jan. 24, 1922

Inventor-
Ludvik Rasch.
By- B. Singer, Atty

Patented July 31, 1923.

1,463,752

UNITED STATES PATENT OFFICE.

LUDVIK RASCH, OF CHRISTIANIA, NORWAY, ASSIGNOR TO AKTIESELSKAPET TURBO-SEPARATOR, OF DRAMMEN, NORWAY.

SEPARATING DISKS IN CENTRIFUGAL SEPARATORS.

Application filed January 24, 1922. Serial No. 531,506.

*To all whom it may concern:*

Be it known that I, LUDVIK RASCH, a subject of the King of Norway, residing at Christiania, Magnusgate 7, Norway, have invented new and useful Improvements in Separating Disks in Centrifugal Separators, of which the following is a specification.

The present invention relates to separating disks and has for its object to provide an arrangement securing a suitable distance between the disks at the same time as an assembling of mud is prevented.

Another object of the invention is to obtain a disk construction adapted for manufacturing in great masses.

The invention is illustrated in the enclosed drawing in which: Fig. 1 shows fractional pieces of two disks disposed above each other.

Figure 1:
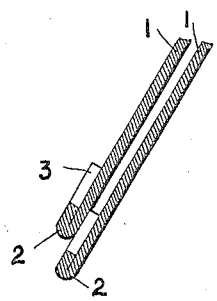

According to the invention the lower edge of the disks are bent, preferably upwards and are provided with pointed tongues. In the drawing, 1 designates the disks themselves folded as shown at 2 so that the bent parts join tightly to the same. At the outer part the fold is provided with the tongue 3 having its pointed portion turned upwards. When the milk is streaming downwards along the disks the same is divided into streams on both sides of the mentioned tongues and will owing to the centrifugal force be thrown outwards through the uncovered openings 4 between each tongue part in the lower disk and the bottom part of the upper disk. The fold will thereby secure a correct distance between the disks and the pointed form of the tongues will effectively prevent mud from being assembled.

Figure 2:
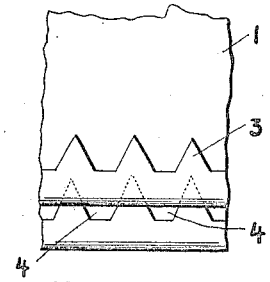
Fig. 2 is a front view of the same.
Figure 5:
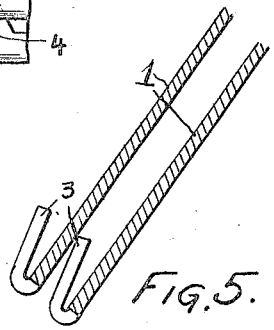
Fig. 5 is a sectional view of another modification.

According to Figs. 1 and 2 the tongues are arranged at a certain distance from each other and the folding line 2 is arranged at a certain distance from the base line of the tongues.

Figure 3:
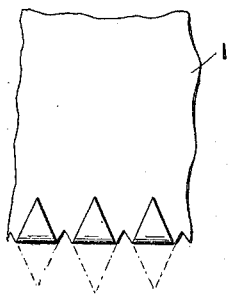
Figs. 3 and 4 show modifications of the same in front views.

According to Fig. 3 the tongues are arranged immediately up to each other, only the outer part of the tongues being bent so that the milk in spite of the said fact will be discharged freely.

Figure 4:
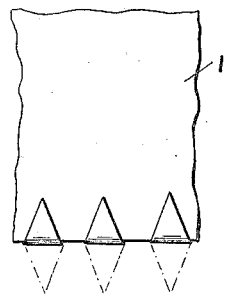

According to Fig. 4 the disks are bent upon the base line of the tongues. In this case, however, the tongues should be arranged at a certain distance from each other similarly to the arrangement shown in Fig. 2.

If a greater distance between the disks is desired than the thickness of the disk material admits the disks may be arranged at their outer part at another angle to the axis than next to the same.

Claims:—

1. In a centrifugal separator a constructional form of the disks characterized therein that the edges of the same are provided with pointed tongues and are bent so that a free outlet will be obtained between the tongues when the disks are placed above each other.

2. A centrifugal separator disk having a fold provided with tongues, the folding line of the disk being internal to the base line of the tongues.

3. A centrifugal separator disk having a fold provided with tongues the folding line being arranged between the base line of the tongues and the points of the same.

4. A centrifugal separator disk having a fold provided with tongues the fold being inclined at another angle to the axis than the angle of inclination of the upper part of the disk.

In witness whereof I affix my signature.

LUDVIK RASCH.